UNITED STATES PATENT OFFICE.

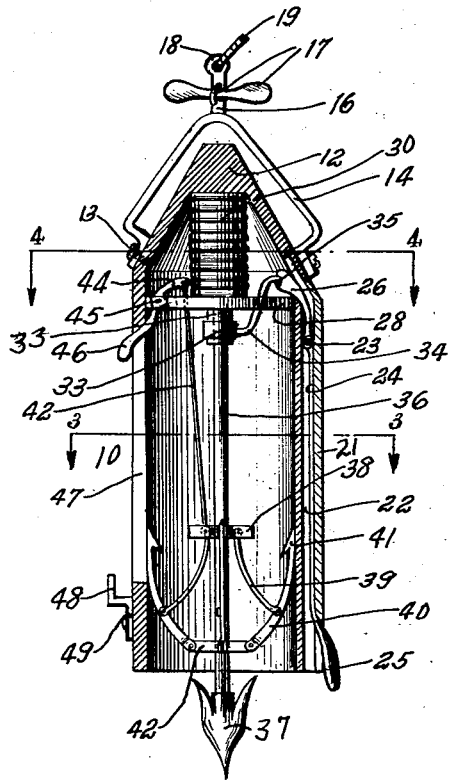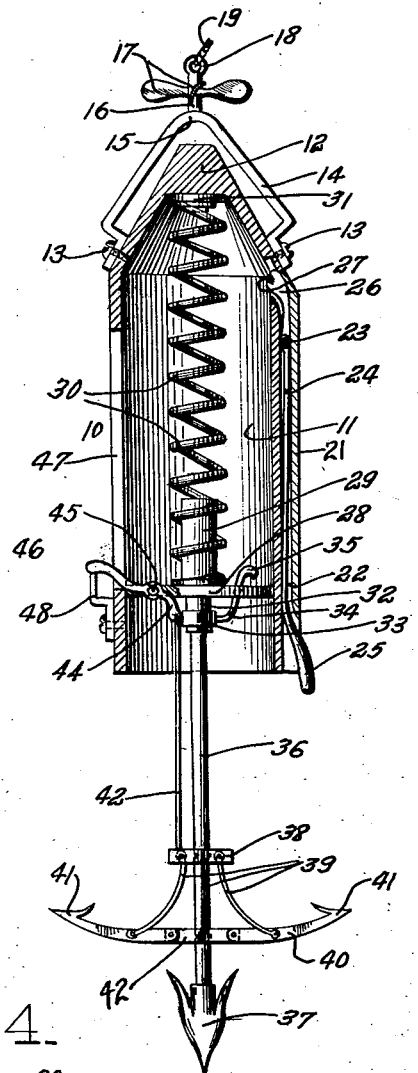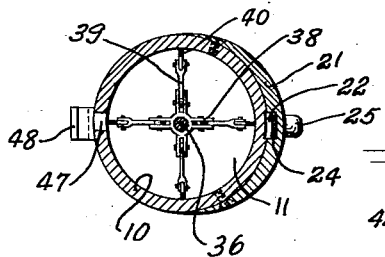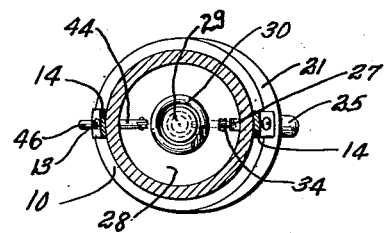

ZAKARIS KORNIS, OF DECATUR, ALABAMA.

FISHING APPARATUS.

1,324,829.  Specification of Letters Patent.  Patented Dec. 16, 1919.

Application filed June 18, 1919. Serial No. 305,111.

*To all whom it may concern:*

Be it known that I, ZAKARIS KORNIS, a citizen of Russia, residing at 116 Lafayette St., Decatur, county of Morgan, and State of Alabama, have invented certain new and useful Improvements in Fishing Apparatus, of which the following is a specification.

This invention relates to improvements in catching fish, and has as its special object the provision of means whereby, upon the contact of a fish with the apparatus, a spear is projected adapted to strike and impale the fish.

A further object is to provide means whereby, upon the propulsion of the spear, that other spear-like elements are extended being adapted to grasp and engage with the body of the fish preventing it from escape, means also being provided whereby the apparatus is caused to rotate as it is lowered into the water.

These and other like objects are attained by the novel construction and combination of parts hereinafter described and shown in the accompanying drawings, forming a material part of this disclosure, and in which—

Figure 1 is a vertical sectional view taken through a fishing apparatus made in accordance with the invention, parts being shown in the retracted position.

Fig. 2 is a similar view of the same, the parts being shown extended.

Fig. 3 is a transverse sectional view taken on line 3—3 of Fig. 1, and Fig. 4 is a similar transverse sectional view taken on line 4—4 of Fig. 1.

Referring to the drawings in detail, a cylindrical casing 10, incloses a chamber 11, open at the bottom and having a conical cover 12 integrally formed with the cylinder.

Attached to the upper portion of the apparatus, by screws or like securing means 13, are a pair of arms 14, converging toward their upper united ends 15, in which is set a rigid post 16, having fixed upon it a plurality of helical vanes 17, by which the apparatus is given a rotary motion as it descends into the water, the upper end of the post having an eye 19 in which is engaged a cable or cord 20 for lowering and maneuvering the apparatus.

Partially inclosing the cylinder 10 is an elongated body 21, the same being firmly secured to the walls of the cylinder and contained therebetween is a channel 22, in which pivoted, near its upper end, on the pin 23, is a lever 24, having a downward and outwardly extending handle 25, adapted to make contact with objects in the water, while the upper arm 26 of the lever contains a notch 27, for purposes hereinafter described.

Arranged to slide internally of the cylinder 10 is a disk 28, having secured to its upper surface a post 29, encircled by the coils of a compression spring 30, the upper end of the spring abutting against a seat 31, formed in the upper end of the conical element 12.

Extending down from the disk 28 is a projection 32 having a fixed collar 33, carrying a rigid arm 34, terminating in an outturned hook portion 35, engageable in the notch 27 of the lever 26, when the lever is in its normal position, and which obviously may be disengaged so as to allow the spring to exert its force thrusting the disk 28 sharply downward.

Extending below the collar 33 is a rod 36, having engaged at its lower end a spear head 37, formed with a sharp point and provided with spurs adapted to engage in the flesh of the fish.

Slidably engaged upon the rod 36 is a spider having arms 38, in which are pivotally engaged curved connections 39, the lower ends of which are pivoted on bars 40, carrying spear shaped ends 41, the bars being pivotally mounted in similar spider arms 42, engaged upon its lower end of the rod 36 above the spear heads 37.

The spears 41 are so arranged when in a collapsed or folded position as to move freely within the cylinder 10 and are actuated due to the connection of a rod 42 pivoted in one of the arms of the spider 38 at its lower end, and connected with a lever 44, in turn pivoted upon a pin 45, set in the disk 28, the extending operative end of the lever passing through a slot 47 formed longitudinally to one side of the cylinder 10, the handle 46 being adapted to make contact with an angular bracket 48, the foot 49 of which is fixed on the lower end of the cylinder in alinement with the slot 47 so that as the spring 30 is released and disk 28 pressed downward thereby, it moves the spider arms 38 upon the rod 36, throwing the spear heads 41 laterally outward in such manner as to engage with the object making contact with the lever handle 25.

From the foregoing it will be seen that an effective implement has been presented by which it is possible to secure fish at a considerable depth and that the apparatus is automatically operated by contact with the fish in an obvious manner.

In operation, the disk 28 having been pressed upwardly and the spear heads 41 folded in the cylinder, the arm 35 is secured in the notch 37, the handle 25 of the lever being pressed outwardly and immediately upon its contact with exterior objects, obviously the parts are released, permitting the spring to operate, pressing the disk 28 and its attached parts downward so that when they arrive at the end of the cylinder that cause the lever element 46 to make contact with the bracket, forcing the spear heads 41 outwardly and materially assisting the operation of the spear 37 in securing the fish.

Having thus described my invention what I claim as new and desire to secure by Letters Patent, is—

1. In a device of the class described the combination with a cylindrical casing a conical top formed therewith and means for manipulating said casing, of means for causing said casing to rotate during its descent, a disk slidably engaged in said cylinder, means for thrusting said disk downwardly, a spear shaft fixed in said disk, said shaft having a spear head at its end, a collar on said shaft, a rigid arm on said collar having a hook-portion, a notched lever adapted to normally receive said hook-portion in its notch for normally holding said disk in a raised position, means for releasing said hook from said notch for permitting said disk to be thrust downwardly, a plurality of lateral spears normally contained in said cylinder and means for releasing said lateral spears when the first named spear has arrived at its outermost position.

2. In a device of the class described the combination with a cylindrical casing having a conical top and means secured thereto by which said casing may be manipulated, means fixed upon said top for causing said casing to rotate during its descent, a disk slidably contained in the cylinder, means for thrusting said disk downwardly, a shaft secured pendently from said disk, a collar on said shaft, a rigid arm on said collar having a hook-portion, a notched lever in said casing adapted to normally receive the said hook-portion in its notch for normally holding said disk in a raised position, said lever having an extending handle adapted to make contact with an object whereby it may be released, a spear head engaged with said shaft, a plurality of radial spears normally contained in said cylinder and means for projecting said radial spears outwardly upon the descent of the first named spear.

In testimony whereof I have affixed my signature.

ZAKARIS KORNIS.